(12) United States Patent
Frank et al.

(10) Patent No.: US 7,489,733 B2
(45) Date of Patent: Feb. 10, 2009

(54) CHANNEL ESTIMATION USING A MINIMIZED CHANNEL PREDICTION INTERVAL

(75) Inventors: Colin D. Frank, Park Ridge, IL (US); Robert J. Corke, Glen Ellyn, IL (US); Steven C. Jasper, Hoffman Estates, IL (US); Isam R. Makhlouf, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 690 days.

(21) Appl. No.: 11/108,291

(22) Filed: Apr. 18, 2005

(65) Prior Publication Data

US 2006/0233268 A1    Oct. 19, 2006

(51) Int. Cl.
H04K 1/10 (2006.01)
H04L 27/28 (2006.01)
(52) U.S. Cl. ...................................... 375/260
(58) Field of Classification Search ................. 375/260, 375/261, 316, 340, 350; 370/206, 207, 210; 455/59

See application file for complete search history.

(56) References Cited

U.S. PATENT DOCUMENTS 5,768,307 A    6/1998    Schramm et al.
5,973,642 A    10/1999    Li
6,320,919 B1    11/2001    Khayrallah et al.
2003/0081695 A1    5/2003    Eilts
2003/0223507 A1    12/2003    DeGaudenzi
2004/0047435 A1    3/2004    Su
2004/0137863 A1    7/2004    Walton et al.
2005/0243791 A1*    11/2005    Park et al. .................... 370/343

* cited by examiner

Primary Examiner—Betsy L Deppe
(74) Attorney, Agent, or Firm—Valerie M. Davis (57) ABSTRACT

A receiver configured for: a) receiving (410) a first OFDM symbol and generating a plurality of demodulated symbols for the first OFDM symbol; b) generating (420) decoder output code symbols corresponding to a subset of the plurality of demodulated symbols; c) determining (430) that a set of the decoder output code symbols make up a set of reference symbols corresponding to at least a portion of the subset of the plurality of demodulated symbols; d) generating (440) the set of reference symbols; e) generating (450) a set of channel estimates based on the set of reference symbols and the at least a portion of the subset of the plurality of demodulated symbols, for use in decoding a current OFDM symbol; and f) repeating steps b-e until a channel estimate for each demodulated symbol corresponding to the first OFDM symbol has been generated.

16 Claims, 7 Drawing Sheets

CHANNEL ESTIMATION USING A MINIMIZED CHANNEL PREDICTION INTERVAL

FIELD OF THE INVENTION

The present invention relates generally to decision-directed channel estimation in a receiver apparatus and more specifically to methods and apparatus for minimizing the channel prediction interval used to generate channel estimates.

BACKGROUND OF THE INVENTION

Pilot symbol aided Minimum Mean-Squared Error (MMSE) channel estimation (which uses only pre-determined or known symbols, commonly referred to in the art as pilot and preamble symbols, in deriving channel estimates) is a well-known method of obtaining channel gain information for symbol decoding in single or multi-carrier systems. For example, the pilot symbol aided MMSE channel estimation method is used in Orthogonal Frequency Division Multiplexing (OFDM) systems such as those that operate in accordance with the Institute of Electrical and Electronics Engineers (IEEE) 802.11a and 802.11g standards.

In some systems, pilot symbol placement and density is designed to enable adequate pilot symbol aided MMSE channel estimation only for low speed applications, for example applications at pedestrian speeds. However, when such systems are operated at higher speeds, a strictly pilot symbol aided channel estimation methodology often proves inadequate. To improve channel estimation for such systems at higher speeds, a decision directed MMSE channel estimation approach may be used. This decision directed approach is also referred to herein as reference symbol aided channel estimation to cover the potential use of both pre-determined as well as regenerated symbols in the channel estimation process. The regenerated reference symbols are typically but not necessarily data symbols.

To implement the reference symbol aided MMSE channel estimation approach using pilot and regenerated symbols, a receiver in an OFDM system generally includes a MMSE predictive channel estimator to extrapolate the channel gain at a given data symbol location or instant. The MMSE estimator is essentially a linear filter that produces smoothed or predicted channel estimates from a set of "raw" or instantaneous estimates typically at nearby (in the time or frequency sense) symbols. The estimator combines these raw channel estimates weighted by appropriate filter coefficients to predict the channel estimate for the given data symbol.

Figure 1:
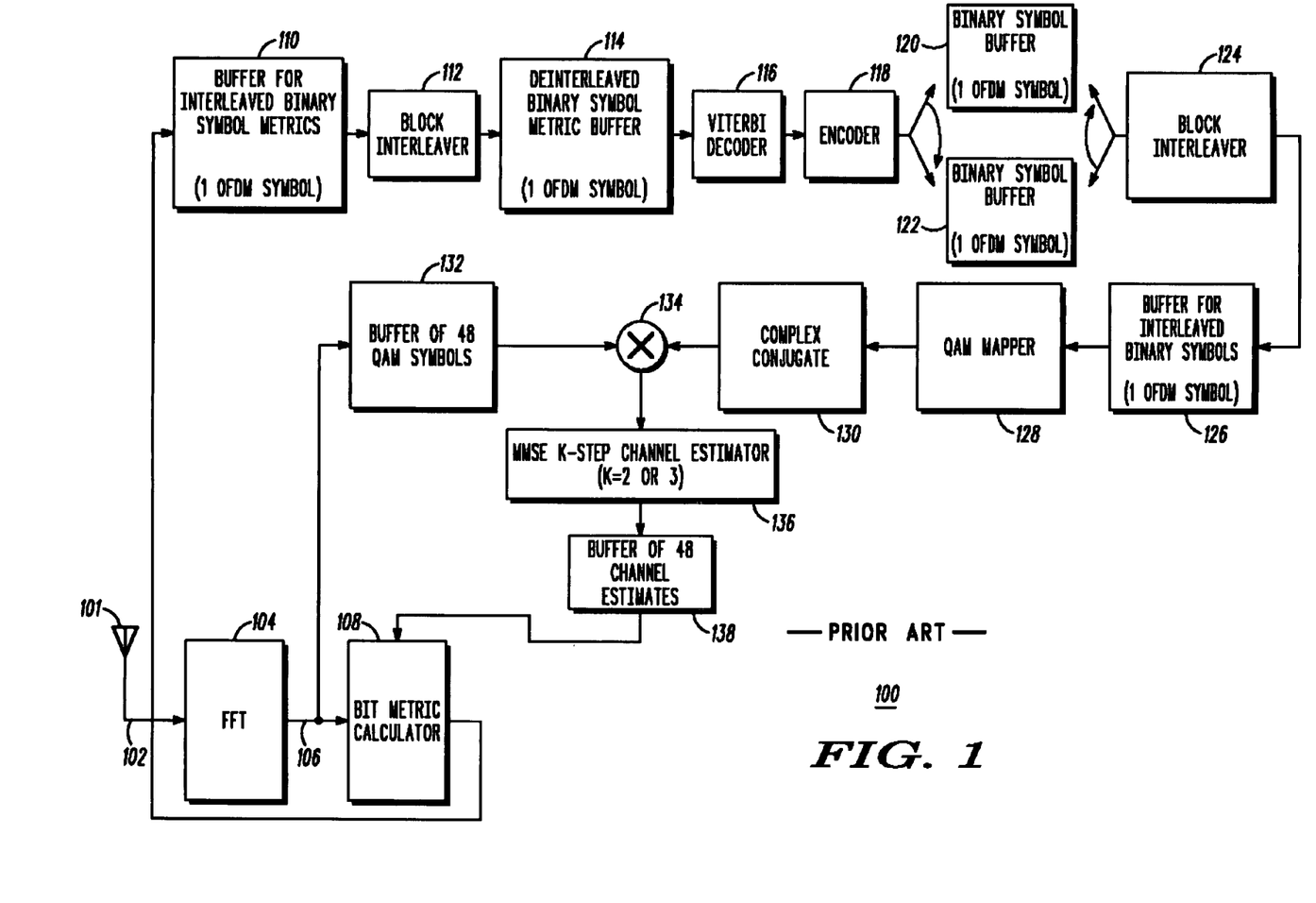
FIG. 1 illustrates a block diagram of a prior art receiver that implements decision-directed channel estimation.

FIG. 1 illustrates a block diagram of a prior art receiver 100 that implements a MMSE channel estimator 136. Receiver 100 includes conventional elements 10l, 102, 104, 106, 108, 110, 112, 114, 116, 118, 120, 122, 124, 126, 128, 130, 132, 134, 136, and 138. The details of the elements of receiver 100 shown in FIG. 1 are well known in the art and will not be recited here for the sake of brevity. However, some operational aspects of receiver 100 will be briefly discussed to explain the shortcomings of this conventional receiver.

As can be seen from FIG. 1, receiver 100 processes blocks of binary code symbols and symbol metrics having a size corresponding to the size of a single OFDM symbol, i.e., receiver 100 implements OFDM symbol block processing. Binary code symbols are defined herein as the binary-valued outputs of an encoder/decoder. Symbol metrics are defined herein as a measure of the confidence or reliability of the demodulated binary code symbols. More particularly, when a radio frequency (RF) signal corresponding to an OFDM symbol 102 is received into antenna 101, demodulator 104 processes the OFDM symbol to generate a plurality of demodulated output symbols 106, with one demodulated output symbol corresponding to each of a plurality of data sub-channels comprising the OFDM symbol. Buffers 110 for temporarily storing interleaved binary symbol metrics, 114 for temporarily storing deinterleaved binary symbols metrics, 120 and 122 for temporarily storing encoded binary symbols, and 126 for temporarily storing interleaved binary symbols are each of a size equal to at least one OFDM symbol to enable OFDM symbol block processing. Accordingly, interleaving using interleaver 124 and reference symbol mapping using Quadrature Amplitude Modulation (QAM) mapper 128 for a given received OFDM symbol can only be performed when all of the binary symbols corresponding to that OFDM symbol have been decoded.

The performance of channel estimator 136, and hence of receiver 100, depends heavily on the delay, measured in OFDM symbols, associated with the decoding and regeneration of the received OFDM symbols. This is particularly true in higher speed applications. In general, the closer in time the regenerated reference symbols used to generate the channel estimate for a current OFDM symbol are to the current OFDM symbol, the better the channel estimate. Thus, any increase in the delay associated with symbol regeneration and the resulting channel estimation will reduce the relevance of the channel estimation relative to the time that it is used. As the delay increases, the prediction interval used by the channel estimator increases, and the quality of the resulting channel estimation is decreased.

As an example, let us assume that receiver 100 operates in accordance with the IEEE 802.11a or 802.11g standard. For all coding rates and QAM constellations, the block interleaver 124 spans exactly one OFDM symbol. Since the interleaver requires the quantity of code symbols contained in an entire OFDM symbol, the interleaver introduces a single OFDM symbol of delay due to the delay introduced by the decoding process. The Viterbi decoder 116 induced delay depends on the traceback length of the decoder, which is typically at least five times the constraint length of the code utilized by the decoder, where the constraint length of the code is taken as one more than log2 of the number of decoder states. For example, the constraint length of a convolutional code used in 802.11a and 802.11g standards is 7, so the traceback length of the decoder is typically chosen to be at least 35 information bits. Given such a decoder traceback length, the channel estimator for receivers operating in accordance with the 802.11a or 802.11g standards will typically have an overall delay of two or three OFDM symbols (i.e., the channel estimator is a K-step predictor with K=2 or 3 OFDM symbols) depending on the modulation type and code rate used.

Figure 2:
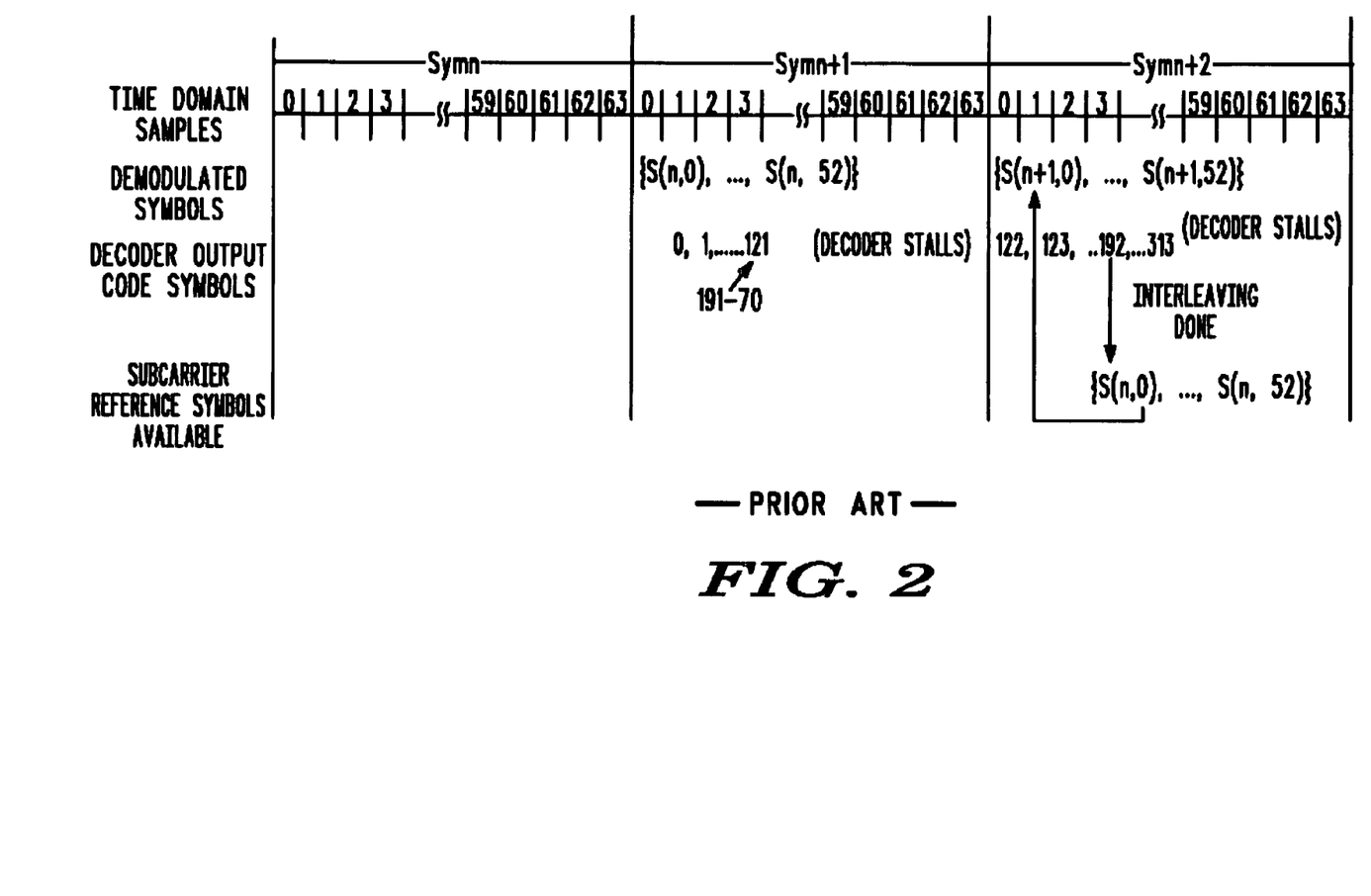
FIG. 2 illustrates a timing diagram for symbol decoding and regeneration in the prior art receiver of FIG. 1.

FIG. 2 is a diagram for symbol decoding and regeneration that illustrates he delay in symbol regeneration in the prior art receiver 100. This diagram assumes a one-half code rate for a 16 QAM scheme, wherein there are 192 binary code symbols per OFDM symbol. As can be seen, OFDM symbols are received at times n, n+1 and n+2. At time n+1, demodulated modulation symbols {S(n,0), . . . , S(n,52)} (also referred to herein interchangeably as demodulated symbols) are generated for the OFDM symbol received at time n. However, due to the traceback delay of the decoder, only binary code symbols 0-121 are generated at the output of the decoder. The remaining decoder code symbols for the OFDM symbol received at time n are not generated until time n+2 when the demodulated symbols for the OFDM symbol received at time n+2 are generated. Therefore, the earliest that channel estimations based upon {S(n,0), ..., S(n, 52) } can be used is in decoding the OFDM symbol received at time n+2.

Thus, there exists a need for a channel estimation method and apparatus that would enable a reduced delay in signal decoding and regeneration to, thereby, enable more relevant channel estimations to be generated for a better receiver quality, especially for higher speed applications.

BRIEF DESCRIPTION OF THE FIGURES

A preferred embodiment of the invention is now described, by way of example only, with reference to the accompanying figures in which.

DETAILED DESCRIPTION OF THE INVENTION

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

Generally speaking, pursuant to the various embodiments of the present invention, apparatus and a method for channel estimation is described that facilitates high-speed operation of systems using decision-directed channel estimation, by enabling channel estimation using a minimized signal decoding and regeneration delay (also referred to herein as a channel prediction delay). Those skilled in the art will realize that the above recognized advantages and other advantages described herein are merely exemplary and are not meant to be a complete rendering of all of the advantages of the various embodiments of the present invention.

Figure 3:
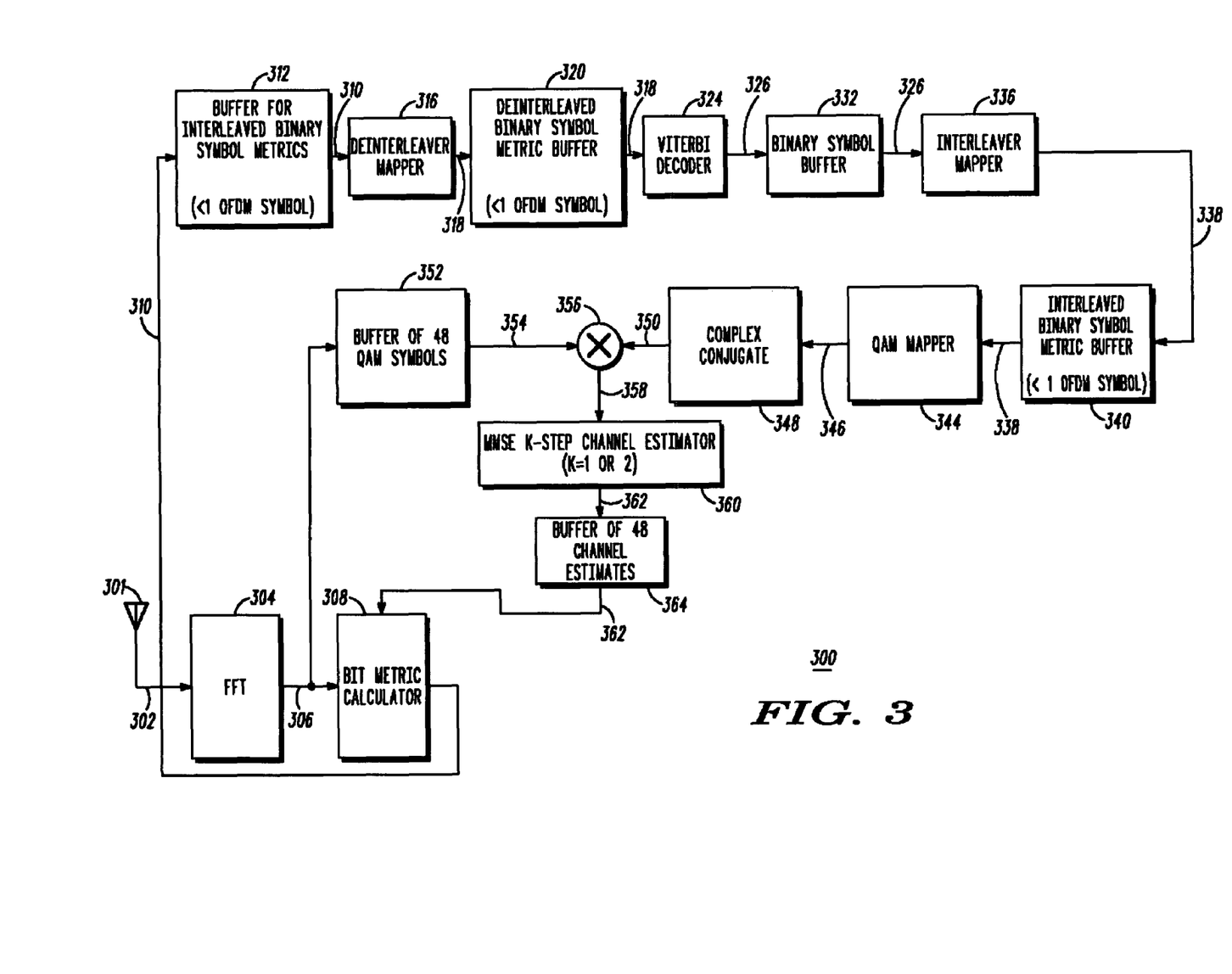
FIG. 3 illustrates a receiver in accordance with various embodiments of the present invention.

Referring now to the drawings, and in particular FIG. 3, a receiver is shown and indicated generally at 300. Those skilled in the art, however, will recognize and appreciate that the specifics of this illustrative example are not specifics of the invention itself and that the teachings set forth herein are applicable in a variety of alternative settings. Receiver 300 may be, for instance, included in an OFDM system (i.e., an OFDM receiver) that operates in the 4.9 GHz frequency spectrum, or any other suitable frequency spectrum, in accordance with the IEEE 802.11a or 802.11g standards. Moreover, receiver 300 may be configured to implement various modulation techniques or schemes such as, for instance, 16 QAM, 64 QAM, Phase Shift keying (PSK), etc. In order to show a practical example of these various teachings, the receiver 300 is described as implementing a QAM modulation technique. However, it should be readily appreciated by one skilled in the art that this illustration is not meant to limit the present invention to this particular modulation technique, and it is contemplated that various embodiments of the present invention may be implemented using other types of modulation techniques.

More specifically, in accordance with the embodiment illustrated in FIG. 3 receiver 300 ideally comprises: one or more antenna elements 301, a demodulation/demodulator apparatus 304 (for example one that implements a Fast Fourier Transform (FFT) operation), a bit metric calculator 308, a complex conjugate block 348, a multiplier 356, a buffer 352 for QAM reference symbols that has a size large enough to store 48 QAM symbols, and a buffer 364 for channel estimates that is large enough to store 48 channel estimates. Conventional apparatus well known in the art, for example, may be used to implement the above elements of receiver 300. Also typically included in receiver 300 but not shown for the sake of clarity in illustrating the embodiments of the present invention is conventional and suitable receiver circuitry, as is well known in the art, between the antenna(s) 301 and the demodulator 304 for performing all required filtering and down-conversion operations needed to obtain a time-domain digital baseband signal 302.

The remaining elements of receiver 300 are configured in accordance with embodiments of the present invention and may be implemented using suitable hardware and/or a suitable processor device that is programmed to execute a set of instructions in accordance with embodiments of the present invention that is stored in a suitable memory (not shown) that may be accessed by receiver 300. These remaining elements include a buffer 312 for interleaved code symbol metrics, a deinterleaved binary code symbol metric buffer 320, a binary (decoded) code symbol buffer 332 and an interleaved binary code symbol metric buffer 340. As can be seen, another benefit of the present invention is that the size of these buffers can be reduced as compared to the buffers used in the prior art. More particularly, buffer 312 can have a minimum size of log2 of the constellation size of the modulation scheme used. The minimum size of buffers 320 and 340 is based on the 802.11a/g interleaving scheme and is 16 times the base 2 logarithm of the constellation size of the modulation scheme used. The maximum size of these buffers is based on the decoding delay of decoder 324, as will be explained in more detail below. Moreover, it should be noted that only one buffer 332 is needed between decoder 324 and interleaver mapper 336 in this embodiment as compared to the two buffers 120 and 122 required in the prior art. In addition, buffer 332 is only needed for implementing block processing in accordance with embodiments of the present invention.

Receiver 300 further includes a deinterleaver mapper 316, an interleaver mapper 336 and a QAM mapper 344 that are not configured as in the prior art for OFDM symbol block processing but are instead configured to operate as soon as the required inputs are available (based on the minimum size of the preceding buffer) or are alternatively configured for block processing using block sizes that are smaller that an OFDM symbol, where the size of the blocks are determined based on the delay of decoder 324. As briefly mentioned, receiver 300 also includes a decoder 324 that is preferably Viterbi algorithm-based and that can also operate on smaller block sizes than is allowable in the prior art. Finally, receiver 300 includes a channel estimator 360 that is ideally a K-step MMSE estimator, where K is typically 1 or 2 depending on the modulation scheme and coding rate used.

In operation, a RF signal (for instance corresponding to an OFDM symbol) is received by antenna(s) 301, which is converted to a digital baseband signal 302. Signal 302 is processed by the FFT demodulation operation 304 to generate a set of demodulated sub-channel complex symbols 306 (also referred to herein as demodulated symbols). The set of demodulated symbols typically includes one demodulated symbol corresponding to each of a plurality of sub-channels that comprise the OFDM symbol. Each complex demodulated symbol 306 and a corresponding channel estimate 362 from buffer 364 (and that was generated by estimator 360) is fed into the bit metric calculator 308 to produce binary code symbol metrics 310 (ideally soft bit metrics).

Binary code symbol metrics 310 are stored in buffer 312, deinterleaved by deinterleaver mapper 316 to produce deinterleaved code symbol metrics 318 which are stored in deinterleaved binary code symbol metric buffer 320. The deinterleaved code symbol metrics 318 are provided to Viterbi decoder 324 which generates output code symbols 326 which are stored in binary symbol buffer 332. Binary code symbols 326 are interleaved by interleaver mapper 336 to generate interleaved binary code symbols 338 and stored in interleaved binary symbol metric buffer 340. Once a sufficient number of binary code symbols 338 are available, they are mapped via QAM mapper 344 to QAM (regenerated) reference symbols 346.

Each regenerated symbol 346 corresponds to a complex symbol in the set of demodulated symbol outputs 306 from the FFT demodulator 304 K OFDM symbols ago, due to deinterleaving, decoding, and symbol regeneration delays, where K is minimized in accordance with embodiments of the present invention. A delayed demodulated symbol 354 comes from buffer 352 and has a K OFDM symbol delay so that it is time-aligned with the corresponding regenerated symbol 346. The delayed, time-aligned sub-channel symbol 306 is scaled by the inverse 350 of the regenerated symbol 346 via the complex conjugate operator 348 and multiplier 356. The output of the multiplier 356 is the raw channel gain estimate 358 from K OFDM symbols ago, and is filtered by channel estimation filter coefficients (not shown), the output of which is the current channel estimate 362. The channel estimator 360 is ideally predictive in nature due to the non-zero delay K.

Figure 4:
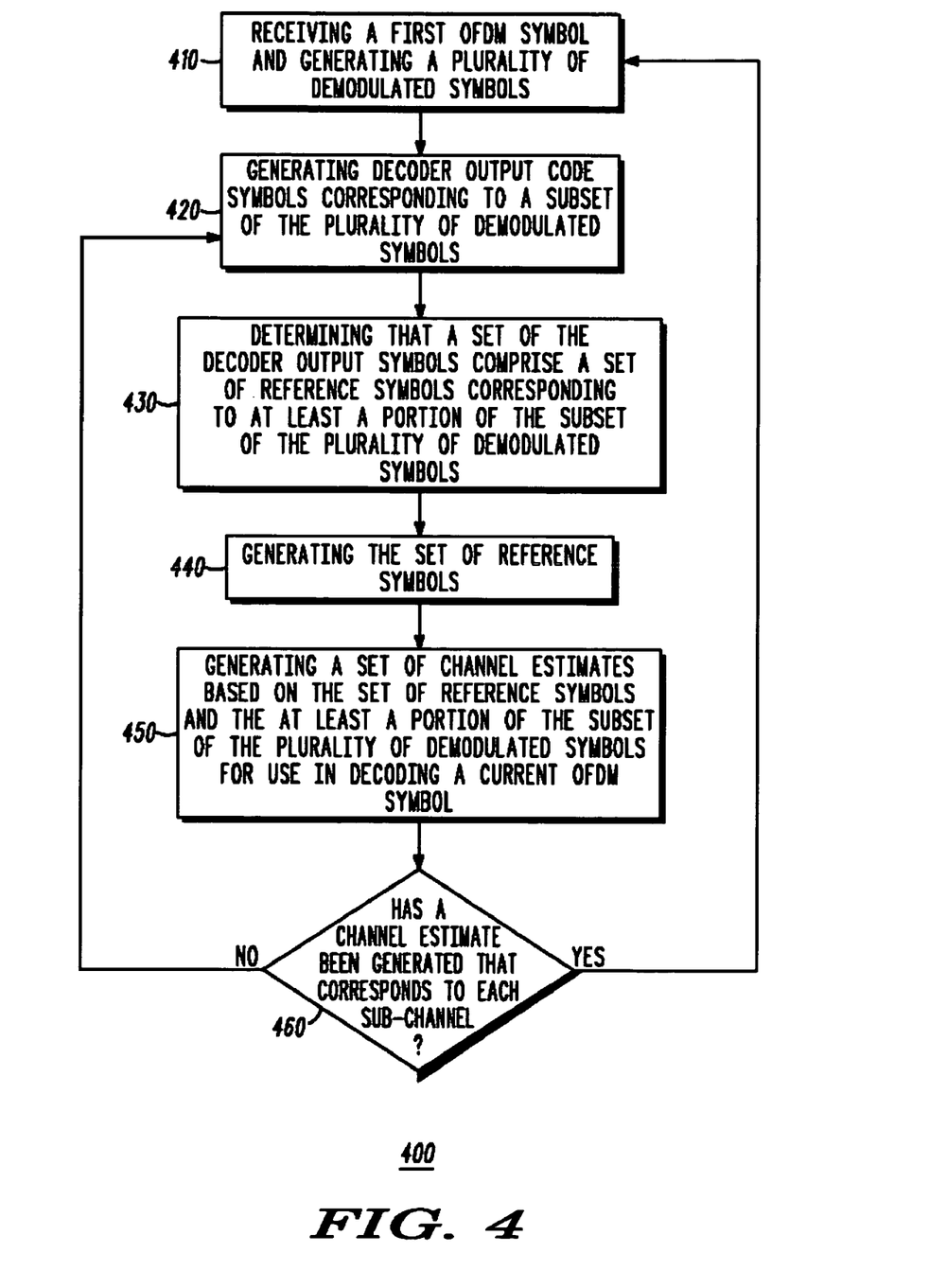
FIG. 4 illustrates a method for channel estimation in accordance with various embodiments of the present invention.

Turning now to FIG. 4, a flow diagram illustrating a method for channel estimation in accordance with embodiments of the present invention is shown and generally indicated at 400, wherein the method enables a minimized K value. Accordingly, receiver 300 is configured for: receiving (410) an OFDM symbol and generating a plurality of demodulated symbols 306 for this OFDM symbol, wherein the plurality of demodulated symbols includes one demodulated symbol for each data-channel over which the OFDM symbol was transmitted. The receiver decoder 324 operates on a first sequence of deinterleaved binary symbol metrics 318 as determined by the size of buffer 320 to generate (420) decoder output code symbols 326 corresponding to a subset of the plurality of demodulated symbols, wherein the subset of the demodulated symbols always contains fewer demodulated symbols than the entire plurality 306 that corresponds to the OFDM symbol due to the size of buffers 312 and 320. More particularly, decoder 324 operates on a group of binary symbol metrics as soon as they are released by the deinterleaved binary symbol metrics buffer 320 upon that buffer reaching capacity, and as was stated earlier the capacity of this buffer in addition to the buffer 312 that precedes it is always less than one OFDM symbol in size.

Receiver 300 determines (430) that a set of the decoder output code symbols make up a set of reference symbols corresponding to at least a portion of the subset of the plurality of demodulated symbols. In other words, it may be determined that a portion of the subset or the entire subset of demodulated symbols 306 that correspond to the demodulated symbols generated at step 420 may be mapped to one or more QAM symbols for only a portion or some of the available data sub-channels. Therefore, QAM mapper 344 is configured to generate (440) QAM reference symbols 346 from interleaved binary symbol metric buffer 340 as soon as any QAM symbol is defined instead of having to wait for the QAM symbols for every sub-channel to be defined, as was required in the prior art. This is why buffer 340 can also be designed to have a maximum size that is less than one OFDM symbol. Using elements 348, 356, 352 and 360, one or more channel estimates 362 are generated (450) based on the set of reference symbols 346 from step 440 and their corresponding time delayed demodulated symbols 354, for use in decoding a portion of a current OFDM symbol. Steps 420-450 are repeated until a channel estimate for each demodulated symbol 306 corresponding to the OFDM symbol received in step 410 (i.e., corresponding to each data sub-channel) has been generated.

Figure 5:
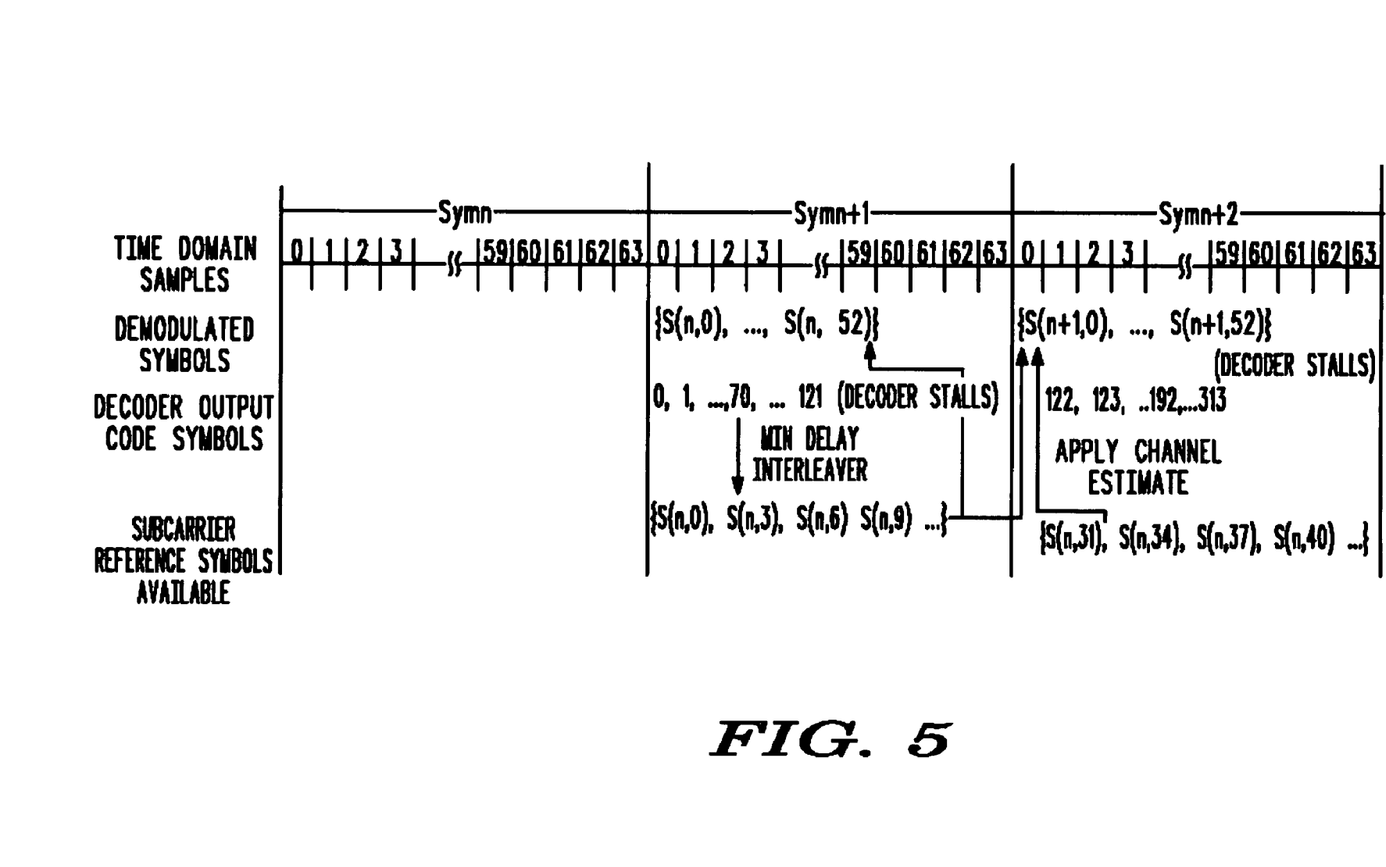
FIG. 5 illustrates a timing diagram for symbol decoding and regeneration in the receiver of FIG. 3.

FIG. 5 illustrates a timing diagram for symbol decoding and regeneration in receiver 300 based on method 400. This diagram shows the reduced delay in symbol regeneration due to method 400. This diagram assumes a one-half code rate for a 16QAM scheme, wherein there are 192 binary code symbols per OFDM symbol. As can be seen, OFDM symbols are received at times n, n +1 and n +2. At time n+1, demodulated symbols $\{S(n,0),\ldots S(n,52)\}$ are generated for the OFDM symbol received at time n. In accordance with the teachings of the present invention, since the QAM mapper 344 does not have to wait to generate reference symbols 346 until binary symbols are released and interleaved for all of the demodulated symbols 306, symbol regeneration e.g., $\{S(n,0), S(n,3), S(n,6), S(n,9)\ldots\}$ can begin at time n+1 for the OFDM symbol received at time n for some of the sub-channels, so that these regenerated symbols can be used to decode the OFDM symbol received at time n+1. Moreover, regenerated symbols for the remaining sub-channels can be generated at time n+2 to be used to complete the decoding of the OFDM symbol received at time n+1, thereby, decreasing the channel prediction interval or delay, K, of the channel estimator 360 from two to one OFDM symbol for this modulation scheme and coding rate.

To further understand method 400 and its benefits, the properties of decoder 324 and interleaver 336 will be further described as these properties relate to the teachings of the present invention. For example, using these properties it can be determined a prior the timing of and the order in which a reference symbol for each data sub-channel will be defined so that it can be generated or mapped by the QAM mapper 344. As described above, in the prior art the Viterbi decoder causes an increased prediction delay due to its traceback length. However, this increased prediction delay resulting from the Viterbi decoder traceback can be avoided as long as the combination of the interleaver and the Viterbi decoder are not self-blocking (or are "non-blocking") with a signal constellation of size $2^m$ and a traceback length N, where m is the number of code symbols per demodulated symbol. In order to determine if the combination is non-blocking, the following steps must first be performed, typically off-line from the receiver operation and prior to receiver design:

i) for each stage of the Viterbi decoder, determine which sub-channels contain the binary code symbols for which metrics are required for the next iteration of the Viterbi decoder; and ii) list all of the binary code symbols that are contained in this set of sub-channels.

Table 1 below illustrates an example for such listing for an interleaver having a one-half coding rate for a 16QAM modulation technique.

TABLE 1

| Sub-channel | code symbols | Sub-channel | code symbols | Sub-channel | Code symbols |
|---|---|---|---|---|---|
| 0 | 0, 16, 32, 48 | 16 | 69, 85, 101, 117 | 32 | 138, 154, 170, 186 |
| 1 | 64, 80, 96, 112 | 17 | 133, 149, 165, 181 | 33 | 11, 27, 43, 59 |
| 2 | 128, 144, 160, 176 | 18 | 6, 22, 38, 54 | 34 | 75, 91, 107, 123 |
| 3 | 1, 17, 33, 49 | 19 | 70, 86, 102, 118 | 35 | 139, 155, 171, 187 |
| 4 | 65, 81, 97, 113 | 20 | 134, 150, 166, 182 | 36 | 12, 28, 44, 60 |
| 5 | 129, 145, 161, 177 | 21 | 7, 23, 39, 55 | 37 | 76, 92, 108, 124 |
| 6 | 2, 18, 34, 50 | 22 | 71, 87, 103, 119 | 38 | 140, 156, 172, 188 |
| 7 | 66, 82, 98, 114 | 23 | 135, 151, 167, 183 | 39 | 13, 29, 45, 61 |
| 8 | 130, 146, 162, 178 | 24 | 8, 24, 40, 56 | 40 | 77, 93, 109, 125 |
| 9 | 3, 19, 35, 51 | 25 | 72, 88, 104, 120 | 41 | 141, 157, 173, 189 |
| 10 | 67, 83, 99, 115 | 26 | 136, 152, 168, 184 | 42 | 14, 30, 46, 62 |
| 11 | 131, 147, 163, 179 | 27 | 9, 25, 41, 57 | 43 | 78, 94, 110, 126 |
| 12 | 4, 20, 36, 52 | 28 | 73, 89, 105, 121 | 44 | 142, 158, 174, 190 |
| 13 | 68, 84, 100, 116 | 29 | 137, 153, 169, 185 | 45 | 15, 31, 47, 63 |
| 15 | 5, 21, 37, 53 | 31 | 74, 90, 106, 122 | 47 | 143, 159, 175, 191 |

If, at every stage of the decoding process, all of the code symbols in (ii) have already been released by the Viterbi decoder with traceback length N, then the interleaver is non-blocking with a decoding traceback length of N and constellation size $2^m$. For example, in order for the Viterbi decoder to operate on the metrics corresponding to binary code symbols 0 and 1, channel estimates for subchannels 0 and 3 are needed. From Table 1 it can be seen that subchannels 0 and 3 are associated with binary code symbols (0,16,32,48) and (1,17,33,49), respectively. Since all binary code symbols 0-121 (191- 35 information bits/(code rate)=191-70 for this example) have been released by the decoder, the corresponding reference symbols for the preceding OFDM symbol can be regenerated.

Using information similar to that contained in Table 2 it can be shown that an 802.11a or 802.11g interleaver, for example, is non-blocking for all modulation and coding rates. Given this non-blocking property, except for rate 1;2 BPSK, it can be further shown that all OFDM symbols prior to the OFDM symbol currently being demodulated can be used as pilots for the purpose of estimating the channel for the current OFDM symbol. For rate ½ BPSK, the prediction delay is 2 OFDM symbols. Therefore, all symbols preceding the current symbol by at least 2 OFDM symbols can be used as pilots for the purpose of channel estimation for the current OFDM symbol.

An exemplary algorithm for minimizing the channel prediction delay can be defined based on the above observations and the following conditions (i)-(iii). At the time at which the demodulator outputs the FFT of the newly received OFDM symbol, the following conditions ideally exist.

i) The binary symbol metrics have been computed for all of the sub-channel outputs of the preceding OFDM symbol, and these metrics were deinterleaved and presented to the Viterbi decoder, which decoded them. The Viterbi decoder then releases an estimate of the bit sequence as well as the corresponding sequence of binary code symbols. The decoder would typically have a traceback length equal to five times the constraint length of the code, and thus the last 35 information bits and corresponding $\lceil 35 \times (\text{code rate})^{-1} \rceil$ binary code symbols have not yet been released from the decoder.

ii) The binary code symbols released by the Viterbi decoder are interleaved and partitioned into blocks of m binary symbols, each of which can be mapped to a QAM signal for one of the sub-channels. At the time the FFT demodulator outputs the newly received OFDM symbol, not all m of the binary code symbols corresponding to each OFDM sub-channel have yet been defined.

iii) For each of the sub-channels of the preceding OFDM symbol for which the QAM symbol has been fully defined (all m binary symbols corresponding to the QAM symbol have been defined), a channel estimate is formed by taking the product of the complex conjugate of the regenerated QAM symbol, the inverse of the energy of this QAM symbol, and the FFT demodulator output corresponding to this OFDM symbol and sub-channel. The resulting channel estimate is provided to the channel prediction filter, which updates the channel estimate for this sub-channel.

From the above condition and properties, the following exemplary method of receiver operation enables all OFDM symbols prior to the current one to be used as pilots in estimating or predicting the channel for the OFDM symbol currently being demodulated and decoded (except for rate ½ BPSK, for which all OFDM symbols 2 or more symbols prior can be used).

i) The Viterbi decoder takes as input the set of binary metrics corresponding to the next iteration of the decoder from the deinterleaver binary symbol metric input buffer. The Viterbi decoder processes these metrics, traces back from the best state, and releases both the information bits and the binary code symbols at the traceback depth.

ii) The newly released binary symbols are encoded and interleaved and placed in the appropriate binary code symbol position of the appropriate sub-channel in the interleaved binary symbol metric buffer.

iii) If, with the release of these binary code symbols, all of the binary code symbols defining a QAM symbol for any of the sub-channels is now defined, then do the following.

a. Map the binary symbols for this sub-channel to the appropriate QAM symbol, and then erase the binary symbols saved for this sub-channel.
b. Form a channel estimate for this sub-channel by multiplying the conjugate of the QAM symbol by both the inverse of its energy and the FFT output for the corresponding OFDM symbol and sub-channel.
c. Provide the channel estimate to the 1-step channel predictor (2-step for rate ½ BPSK) which updates the channel estimate for this sub-channel.
d. Use the FFT output corresponding to this sub-channel for the current OFDM symbol along with the newly updated channel estimate to compute the binary symbol metrics for this sub-channel of the current OFDM symbol.
e. Deinterleave the binary symbol metrics and place them into the input buffer for the Viterbi decoder.

iv) Go to (i).

In the exemplary method just described, the binary symbols released by the Viterbi decoder iteration are interleaved immediately after release, and the blocks of m binary symbols are mapped and used to update the channel estimate as soon as the block of m binary symbols is fully defined. However, another embodiment of the present invention may be implemented that is less stringent with respect to the timing of the interleaving/deinterleaving, signal regeneration and channel estimation. Moreover, depending on the traceback length N used, the interleaver and decoder defined, for example, in 802.11a or 802.11g for a given signal constellation and code rate will be still be non-blocking even with block processing, so long as the block is small enough.

The maximum block size for which the interleaver and decoder are non-blocking are given in the last column of Table 2 for a traceback length of 35 information bits. Note that the block size is measured in information bits. The maximum block size in binary symbols can be determined by multiplying this number by the inverse of the code rate. Thus, the maximum sizes of buffers 312, 320, 332 and 340 can be set to be equivalent to the maximum block sizes illustrated in Table 2.

TABLE 2

| | N = bits/ OFDM symbol | Prediction interval (OFDM symbols) for processing with block size N | Minimum prediction interval with no block processing | Max block size for prediction interval (measured in information bits) |
|---|---|---|---|---|
| Rate ½ BPSK | 24 | 3 | 2 | 12 |
| Rate ¾ BPSK | 36 | 2 | 1 | 1 |
| Rate ½ QPSK | 48 | 2 | 1 | 5 |
| Rate ¾ QPSK | 72 | 2 | 1 | 25 |
| Rate ½ 16-QAM | 96 | 2 | 1 | 37 |
| Rate ¾ 16-QAM | 144 | 2 | 1 | 73 |
| Rate ⅔ 64-QAM | 192 | 2 | 1 | 104 |
| Rate ¾ 64-QAM | 216 | 2 | 1 | 121 |

Figure 6:
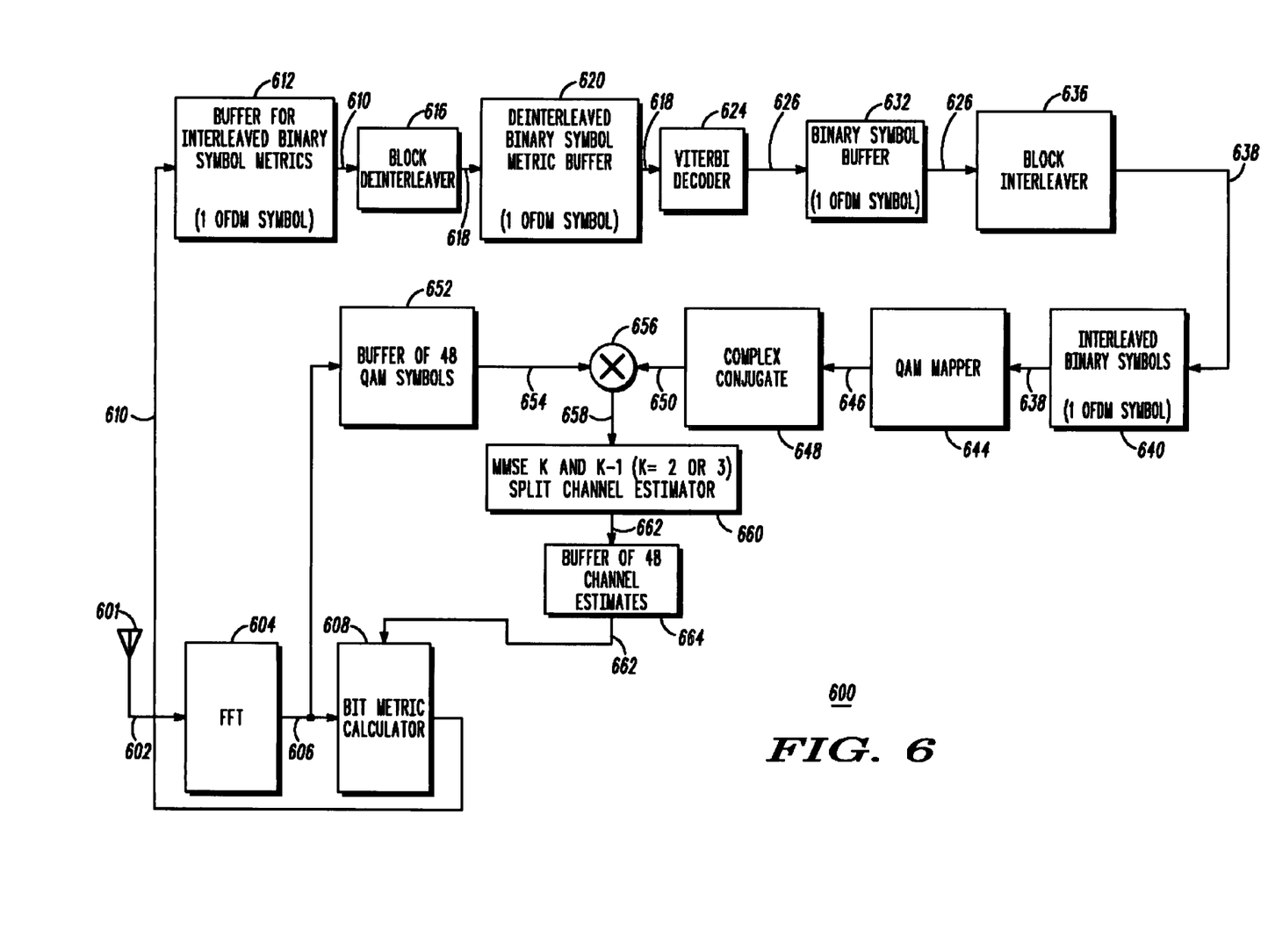
FIG. 6 illustrates a receiver in accordance with various embodiments of the present invention.

Turning now to FIG. 6, a receiver is shown and indicated generally at 600. This receiver is very similar to receiver 300 except that receiver 600 performs OFDM symbol block processing. Accordingly, receiver 600 includes elements 601, 602, 604 (outputting demodulated symbols 606), 608, 612 (storing binary code symbol metrics 610), 616, 620 (storing deinterleaved code symbol metrics 618), 624, 632 (storing output code symbols 626), 636, 640 (storing interleaved binary code symbols 638), 644, 648, 652 (storing demodulated symbols 606 and outputting delayed demodulated symbols 654), 656 (generating raw channel gain estimates 658), 660 (generating current channel estimations 662), and 664 (storing the current channel estimations 662), with a difference from the corresponding elements of receiver 300 being that buffers 612, 620, and 640 have sizes corresponding to at least one OFDM symbol. Additionally, channel estimator 660 is comprised of two separate channel estimators each operating on a separate set of subchannels corresponding to different prediction intervals. The partitioning of subchannels is based on whether or not the corresponding binary code symbols are available upon completion of the decoding of the previous OFDM symbol. Availability is based on the traceback delay of the decoder. Table 3 below illustrates this partitioning of the subchannels for each of the coding rate and modulation scheme combinations supported in the 802.11 a/g standards. For each coding rate and modulation scheme combination (with the exception of rate ½ BPSK), a prediction interval of 1 and corresponding filter are used for all subchannels listed in the first column, and a prediction interval of 2 and corresponding filter are used for all subchannels listed in the second column. The prediction intervals for rate ½ BPSK are 2 and 3, respectively, for columns one and two.

TABLE 3

| | Sub-channels with prediction interval k = 1 (for rate ½ BPSK, k = 2) | Sub-channels with prediction interval k = 2 (for rate ½ BPSK, k = 3) |
|---|---|---|
| Rate ½ BPSK | 0, 1, 3, 4, 6, 7, 9, 10, 12, 13, 15, 16, 18, 19, 21, 22, 24, 25, 27, 28, 30, 33, 36, 29, 42, 45 | 2, 5, 8, 11, 14, 17, 20, 23, 26, 29, 31, 32, 34, 35, 37, 38, 40, 41, 43, 44, 46, 47 |
| Rate ¾ BPSK | 0, 3 | 1, 2, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47 |

TABLE 3-continued

| | Sub-channels with prediction interval k = 1 (for rate ½ BPSK, k = 2) | Sub-channels with prediction interval k = 2 (for rate ½ BPSK, k = 3) |
|---|---|---|
| Rate ½ QPSK | 0, 3, 6, 9, 12, 15, 18, 21, 24, 27 | 1, 2, 4, 5, 7, 8, 10, 11, 13, 14, 16, 17, 19, 20, 22, 23, 25, 26, 28, 29, 30, 31, 32, 33, 34, 35, 36, 37, 38, 39, 40, 41, 42, 43, 44, 45, 46, 47 |
| Rate ¾ QPSK | 0, 1, 3, 4, 6, 9, 12, 15, 18, 21, 24, 27, 30, 33, 36, 39, 42, 45 | 1, 2, 4, 5, 7, 8, 10, 11, 13, 14, 16, 17, 19, 20, 22, 23, 25, 26, 28, 29, 31, 32, 34, 35, 37, 38, 40, 41, 43, 44, 46, 47 |
| Rate ½ 16-QAM | 0, 1, 3, 4, 6, 7, 9, 10, 12, 13, 15, 16, 18, 19, 21, 22, 24, 25, 27, 28, 30, 33, 36, 39, 42, 45 | 2, 5, 8, 11, 14, 17, 20, 23, 26, 29, 31, 32, 34, 35, 37, 38, 40, 41, 43, 44, 46, 47 |
| Rate ¾ 16-QAM | 0, 1, 3, 4, 6, 7, 9, 10, 12, 13, 15, 16, 18, 19, 21, 22, 24, 25, 27, 28, 30, 31, 33, 34, 36, 37, 39, 40, 42, 43, 45, 46 | 2, 5, 8, 11, 14, 17, 20, 23, 26, 29, 32, 35, 38, 41, 44, 47 |
| Rate ⅔ 64-QAM | 0, 1, 3, 4, 6, 7, 9, 10, 12, 13, 15, 16, 18, 19, 21, 22, 24, 25, 27, 28, 30, 31, 33, 34, 36, 37, 39, 40, 42, 43, 45, 46 | 2, 5, 8, 11, 14, 17, 20, 23, 26, 29, 32, 35, 38, 41, 44, 47 |
| Rate ¾ 64-QAM | 0, 1, 3, 4, 6, 7, 9, 10, 12, 13, 15, 16, 18, 19, 21, 22, 24, 25, 27, 28, 30, 31, 33, 34, 36, 37, 39, 40, 42, 43, 45, 46 | 2, 5, 8, 11, 14, 17, 20, 23, 26, 29, 32, 35, 38, 41, 44, 47 |

Figure 7:
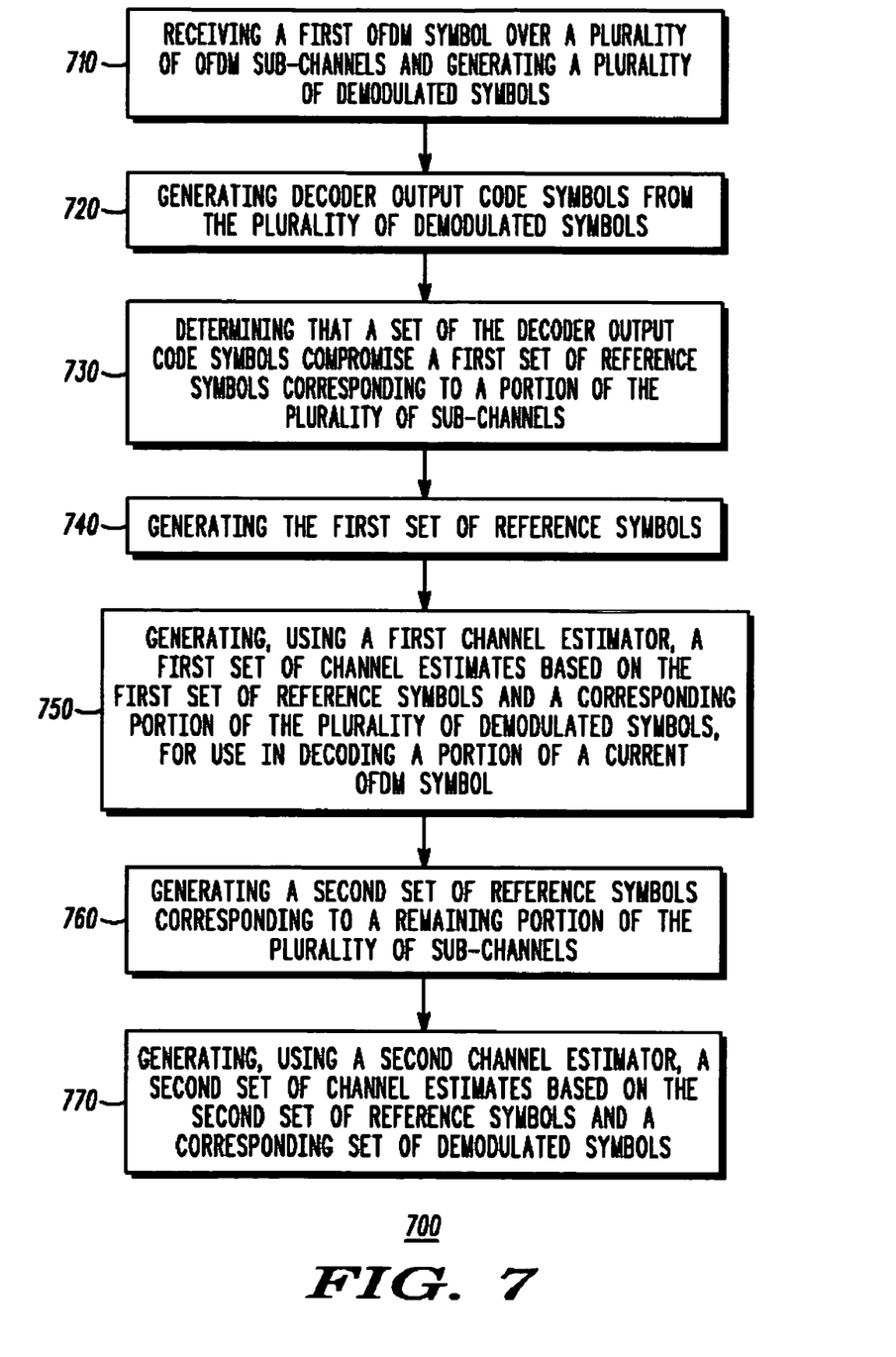
FIG. 7 illustrates a method for channel estimation in accordance with various embodiments of the present invention.

Turning now to FIG. 7, a flow diagram illustrating a method for channel estimation in accordance with embodiments of the present invention is shown and generally indicated at 700, wherein the method enables OFDM symbol block processing. Accordingly, receiver 600 is configured for: receiving (710) a first OFDM symbol over a plurality of OFDM sub-channels and generating a plurality of demodulated symbols for the first OFDM symbol comprising a demodulated symbol corresponding to each sub-channel. The decoder 624 operates on a block of deinterleaved binary symbol metrics to generate (720) decoder output code symbols from the plurality of demodulated symbols (corresponding to the first OFDM symbol).

Receiver 600 determines (730) that a set of the decoder output code symbols comprise a first set of reference symbols corresponding to a portion of the plurality of sub-channels from the first OFDM symbol; generates (740) the first set of reference symbols; and generates (750), using a first channel estimator having a first prediction interval, a first set of channel estimates based on the first set of reference symbols and a corresponding portion of the plurality of demodulated symbols (corresponding to the first OFDM symbol), for use in decoding a portion of a current OFDM symbol. The first set of subchannels and reference symbols may be predetermined and correspond, for instance, to the first column of Table 3. The receiver 600 further generates (760) a second set of reference symbols corresponding to a remaining portion of the plurality of sub-channels and generates (770), using a second channel estimator having a second prediction interval that is greater than the first prediction interval, a second set of channel estimates based on the second set of reference symbols and a corresponding set of demodulated symbols, for use in decoding the remaining portion of the current OFDM symbol. The second set of subchannels and reference symbols may be predetermined and correspond, for instance, to the second column of Table 3. Moreover, the corresponding set of demodulated symbols used to generate the second set of channel estimates correspond to a second OFDM symbol that is received prior to the first OFDM symbol.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for channel estimation for use in decoding a current Orthogonal Frequency Division Multiplexing (OFDM) symbol, the method comprising the steps of:
   a) receiving a first OFDM symbol over a plurality of OFDM sub-channels and generating a plurality of demodulated symbols for the first OFDM symbol comprising a demodulated symbol corresponding to each sub-channel;
   b) generating decoder output code symbols corresponding to a subset of the plurality of demodulated symbols;
   c) determining that a set of the decoder output code symbols comprise a set of reference symbols corresponding to at least a portion of the subset of the plurality of demodulated symbols;
   d) generating the set of reference symbols;
   e) generating a set of channel estimates based on the set of reference symbols and the at least a portion of the subset of the plurality of demodulated symbols, for use in decoding the current OFDM symbol; and
   f) repeating steps b-e until a channel estimate for each demodulated symbol corresponding to the first OFDM symbol has been generated.

2. The method of claim 1, wherein each reference symbol is one of a Quadrature Amplitude Modulation (QAM) symbol and a Phase Shift Keying (PSK) symbol.

3. The method of claim 1, wherein the first OFDM symbol is received one OFDM symbol in time prior to the current OFDM symbol.

4. The method of claim 1, wherein the first and current OFDM symbols are generated using a one half rate Binary Phase Shift Keying scheme, and the first OFDM symbol is received two OFDM symbols in time prior to the current OFDM symbol.

5. The method of claim 1, wherein the set of decoder output code symbols corresponds to a block of information bits having a size that is based at least on a decoding delay of and a modulation scheme used in a receiver implementing the method.

6. The method of claim 1, wherein the set of decoder output code symbols corresponds to a single reference symbol.

7. The method of claim 1, wherein the decoder output code symbols are generated by a decoder defined in Institute of Electrical and Electronics Engineers 802.11 a standard or 802.11 g standard.

8. A method for channel estimation for use in decoding a current Orthogonal Frequency Division Multiplexing (OFDM) symbol, the method comprising the steps of:
   a) receiving a first OFDM symbol over a plurality of OFDM sub-channels and generating a plurality of demodulated symbols for the first OFDM symbol comprising a demodulated symbol corresponding to each sub-channel;
   b) generating decoder output code symbols from the plurality of demodulated symbols;
   c) determining that a set of the decoder output code symbols comprise a first set of reference symbols corresponding to a portion of the plurality of sub-channels;
   d) generating the first set of reference symbols;
   e) generating, using a first channel estimator having a first prediction interval, a first set of channel estimates based on the first set of reference symbols and a corresponding portion of the plurality of demodulated symbols, for use in decoding a portion of the current OFDM symbol;
   f) generating a second set of reference symbols corresponding to a remaining portion of the plurality of sub-channels; and
   g) generating, using a second channel estimator having a second prediction interval that is greater than the first prediction interval, a second set of channel estimates based on the second set of reference symbols and a corresponding set of demodulated symbols, for use in decoding a remaining portion of the current OFDM symbol.

9. The method of claim 8, wherein each reference symbol is one of a Quadrature Amplitude Modulation (QAM) symbol and a Phase Shift Keying (PSK) symbol.

10. The method of claim 8, wherein:
   the first OFDM symbol is received one OFDM symbol in time prior to the current OFDM symbol;
   the first prediction interval is one OFDM symbol; and
   the second prediction interval is two OFDM symbols.

11. The method of claim 8, wherein:
   the first and current OFDM symbols are generated using a one half rate Binary Phase Shift Keying scheme;
   the first OFDM symbol is received two OFDM symbols in time prior to the current OFDM symbol;
   the first prediction interval is two OFDM symbol; and
   the second prediction interval is three OFDM symbols.

12. The method of claim 8, wherein the decoder output code symbols are generated by a decoder defined in Institute of Electrical and Electronics Engineers 802.11a standard or 802.11g standard.

13. The method of claim 8, wherein the number of reference symbols in the first set is based on a traceback delay of a decoder in a receiver implementing the method.

14. The method of claim 8, wherein the second set of reference symbols and its corresponding set of demodulated symbols is based on a second OFDM symbol that is received one OFDM symbol in time prior to the first OFDM symbol.

15. A receiver comprising:
   at least one antenna element for receiving a signal;
   receiver circuitry for receiving a first OFDM symbol over a plurality of OFDM sub-channels and generating a baseband signal from the received signal;
   a demodulator for generating from the baseband signal a plurality of demodulated symbols for the first OFDM symbol comprising a demodulated symbol corresponding to each sub-channel; and
   a processor configured for performing the steps of:
      a generating decoder output code symbols corresponding to a subset of the plurality of demodulated symbols;
      b determining that a set of the decoder output code symbols comprise a set of reference symbols corresponding to at least a portion of the subset of the plurality of demodulated symbols;
      c generating the set of reference symbols;
      d generating a set of channel estimates based on the set of reference symbols and the at least a portion of the subset of the plurality of demodulated symbols, for use in decoding the current OFDM symbol; and
      e repeating steps a-d until a channel estimate for each demodulated symbol corresponding to the first OFDM symbol has been generated.

16. The receiver of claim 15, wherein the decoder output code symbols are generated by a decoder defined in Institute of Electrical and Electronics Engineering 802.11a standard or 802.11g standard.

* * * * *